United States Patent [19] [11] Patent Number: 4,678,071
Ball et al. [45] Date of Patent: Jul. 7, 1987

[54] DIAPHRAGM SPRING CLUTCH COVER ASSEMBLY

[75] Inventors: Robert J. Ball, Bishops Itchington; Ian C. Maycock, Leamington Spa, both of England

[73] Assignee: Automotive Products plc, Leamington Spa, England

[21] Appl. No.: 877,354

[22] Filed: Jun. 23, 1986

[30] Foreign Application Priority Data

Jul. 10, 1985 [GB] United Kingdom ................ 8517470
Feb. 27, 1986 [GB] United Kingdom ................ 8604874

[51] Int. Cl.$^4$ ............................................. F16D 13/50
[52] U.S. Cl. ................................ 192/70.27; 192/89 B; 192/109 A
[58] Field of Search .............. 192/89 B, 70.27, 109 A

[56] References Cited

U.S. PATENT DOCUMENTS 4,095,683  6/1978  Ban ..................... 192/89 B X
4,184,578  1/1980  Moore et al. ............ 192/89 B
4,291,792  9/1981  Henao ................... 192/89 B

FOREIGN PATENT DOCUMENTS

2205456  8/1973  Fed. Rep. of Germany ... 192/70.27
943039  11/1963  United Kingdom ............. 192/89 B Primary Examiner—Carl D. Friedman
Attorney, Agent, or Firm—Solon B. Kemon

[57] ABSTRACT

A diaphragm spring clutch cover assembly having a cover to be secured to a driven plate or flywheel and a pressure plate attached to the cover and urged by a diaphragm spring to press a driven plate against the driving plate in an assembled clutch. The diaphragm spring acts between a first fulcrum arrangement on the pressure plate and a second fulcrum arrangement on the cover. The first fulcrum arrangement comprises arcuate spaced lands in a circle on the pressure plate, a resilient wire fulcrum ring engaged by the lands and spanning the spaces between the lands, and U-shaped saddles straddling the ring at those spaces. The saddles are pressed axially of the clutch by the diaphragm spring so that during clutch re-engagement the axial deformation of the spanning portions of the ring in a first axial direction creates a first stage of cushioning. Simultaneously the parts of the fulcrum ring over the lands bow in an opposite second direction, and these bows are subsequently compressed by the diaphragm spring during a second stage or harder cushioning.

19 Claims, 18 Drawing Figures

DIAPHRAGM SPRING CLUTCH COVER ASSEMBLY

BACKGROUND OF THE INVENTION

This invention concerns a diaphragm spring clutch cover assembly of the type (hereinafter called "the type referred to") comprising a pressure plate, a cover, and a diaphragm spring acting between a first annular fulcrum arrangement on the pressure plate and a second annular fulcrum arrangement on the cover.

In use the assembly is secured to a driving member, for example a fly-wheel of a motor vehicle engine, so that a driven plate is clamped between the pressure plate and the driving member by the load of the diaphragm spring. Usually the diaphragm spring has a plurality of radially inwardly directed fingers so that the driven plate can be released by an axial effort applied through a release bearing to radially inner ends of the fingers.

In well known clutches comprising cover assemblies of the type referred to the driven plate is cushioned in that it comprises a carrier plate having friction facings mounted on cushioning between the facings. But to simplify and cheapen production of driven plates and to reduce inertia thereof, driven plates with reduced or no cushioning between the friction facings have been proposed. To compensate for this lack of cushioning it has been proposed to incorporate means which provides a degree of axial flexibility or cushioning into one of the annular fulcra in a diaphragm spring clutch assembly of the type referred to. One way of providing cushioning means in the clutch cover assembly which is simple to manufacture and install and yet provides a subjectively acceptable clutch engagement when mounted in a motor vehicle is disclosed in G.B. Pat. No. 1583403. That patent describes a diaphragm spring clutch cover assembly of the type referred to further comprising cushioning means in one of the annular fulcra arrangements, the cushioning means being formed by a single wavy ring having undulations which extend parallel to the axis of the diaphragm spring, and the undulations being constituted by a first series and by a second series of said undulations wherein the undulations of the first series have a lower stiffness but greater axial amplitude and wavelength than the undulations of the second series. During re-engagement of the driven plate (after a dis-engagement) the initial cushioning is by the first series and then by both series, which ensures that the clamp load increases progressively over a substantial range of movement of the release bearing during clutch re-engagement.

It has been found that manufacturing a wavy ring having undulations of differing stiffnesses and sizes can be difficult in mass production.

An object of this invention is to provide a diaphragm spring clutch cover assembly of the type referred to capable of being constructed, as will be understood from the ensuing description with reference to the drawings, in which the aforesaid difficulty can be avoided and at the same time that assembly can be used to form a clutch for a motor vehicle in which clutch engagement is subjectively acceptable and the clamp load increases progressively during re-engagement.

SUMMARY OF THE INVENTION

According to the invention there is provided a diaphragm spring clutch cover assembly comprising a pressure plate, a cover, a diaphragm spring for loading the pressure plate, a first annular fulcrum arrangement to one side of the diaphragm spring and provided on the pressure plate, a second annular fulcrum arrangement to the opposite side of said diaphragm spring and provided on the cover, and the diaphragm spring acting between the fulcrum arrangements, characterised in that at least one of the fulcrum arrangements comprises cushioning means comprising a resilient fulcrum ring, an annular array of spaced supporting means supporting the ring about the axis of the diaphragm spring, portions of the ring each spanning a respective space between adjacent said supporting means, elements astride the ring at spaced locations around the ring, each element being at a respective said portion, and each said element providing a distance piece proud of the ring, and the distance pieces being urgeable by the diaphragm spring for the resilient deformation of said respective portions axially of the ring in their respective spaces during movement relative to the cover of the diaphragm spring for the latter to apply increasing loading on the pressure plate.

Each said element astride the fulcrum ring may have a substantially U-shaped cross-section, and the distance piece may be the cross-piece of the U.

A said element may be engageable by respective stop means to maintain the element at substantially the same position around the fulcrum ring.

Preferably the fulcrum ring has at least one interruption, extending therethrough, and said interruption may be spanned by a said element.

The distance, in a circumferential direction of the fulcrum ring, between a said element and an adjacant said supporting means may be greater than the distance in the circumferential direction of the fulcrum ring, between another said element and a supporting means adjacent thereto.

In the circumferential direction of the fulcrum ring, the distance between opposite ends of a said supporting means may be greater than the distance between the opposite ends of another said supporting means.

In the circumferential direction of the fulcrum ring, a said element may be longer than another said element.

The arrangement may be such that an increase in the diaphragm spring loading on the pressure plate subsequent to a position of minimum loading causes aforesaid fulcrum ring portions to be deformed axially of the ring in a first direction so stressing the ring that it has a tendency to bow in an opposite second direction at aforesaid supporting means and the diaphragm spring acts on one or more bows to deform said bow(s) axially of the ring by compression of the bow(s) in said first direction.

In order to provide assistance to or control deformation of the fulcrum ring so that the latter may deform in a more controlled or pre-determined manner such as may reduce the chance of damage to the ring and/or permit the resultant cushioning to conform more closely to a desired character, there can be provided according to a second aspect of the invention a diaphragm spring clutch cover formed according to the first aspect and further comprising at least one of said elements having a surface pressed against its respective said portion of the ring by urging by the diaphragm spring, said surface being convex with respect to the ring, said convex surface may, with respect to the ring, extend substantially circumferentially along the ring, and at least a portion of the convex surface diverges progressively away from the pressure plate.

According to a third aspect of the invention there is provided a diaphragm clutch cover assembly according to the second aspect wherein during axial deformation of a said portion of the fulcrum ring a part of said portion in contact with the convex surface conforms more closely to that surface whereby a free length of said portion extending between an adjacent said supporting means and the element having the convex surface progressively decreases.

According to a forth aspect of the invention there is provided a diaphragm spring clutch cover assembly formed according to the third aspect wherein a said supporting means adjacent to a said element has a surface which is convex to the fulcrum ring applied against that surface, and as axial deformation of the portions of the fulcrum ring increase a part of the fulcrum ring over the convex surface of that supporting means conforms more closely to the convex surface of the latter further decreasing the length of said free length. According to a fifth aspect of the invention there is provided a clutch cover according to the first aspect to wherein a said supporting means adjacent to a said element has a surface which is convex to the fulcrum ring applied against that surface, and wherein during axial deformation of a said portion of the fulcrum ring a part of said portion conforms more closely to that surface whereby a free length of said portion extending between the element on said portion and the convex surface progressively decreases.

The progressive decrease in an aforesaid free length makes it progressively more stiff and therefore progressively more resistant to deformation.

An aforesaid convex surface can be curved, for example arcuate, or can be dihedral or polyhedral.

BRIEF DESCRIPTION OF THE DRAWINGS

The invention will now be further described, by way of example, with reference to the accompanying drawings, in which.

DETAILED DESCRIPTION OF EMBODIMENTS

In the drawings like reference numerals refer to like or comparable parts.

With reference to FIGS. 1 to 6 a clutch cover assembly 2 comprises a dish shaped cover 4, a diaphragm spring 6, and an annular pressure plate 8.

The cover 4 has a flanged rim 10 apertured at 12 to receive bolts B (only one shown) for clamping the cover assembly to a rotatably driven driving plate F (shown in dotted line) which may be a fly-wheel driven by the engine of a motor vehicle. Between the driving and pressure plates F and 8 is a driven plate D known per se having friction facings E, which may be mounted on the driven plate in a substantially non-cushioned manner, if desired. The driven plate D has a central hub H axially slidably engaging in known manner axial splines on a shaft (not shown) to be rotatably driven about axis X (FIG. 2) by the driven plate. That shaft can be an input shaft to a gearbox.

In known manner the diaphragm spring 6 comprises a circumferential Belleville portion 14 integral with inwardly radially extending release levers or fingers 16 spaced by radial slots 18. The diaphragm spring is constrained between two fulcrum arrangements 20 and 22 formed by wire rings held in place by the cover 4 and an annular plate 24 held on the cover by rivets 26. Each ring 20 or 22 is a split ring with axially turned pegs 28, 30 or 32, 34 at its ends to engage in aperture 36 or 38 in the diaphragm spring 6.

Radially outwardly of the fulcra 20 and 22 the diaphragm spring 6 acts on a fulcrum arrangement 40 on the pressure plate 8.

The pressure plate 8 rotates about axis X with the cover 4 and driving plate F by means of tangential drive straps 42 each bolted at one end at 44 to the pressure plate and riveted at 46 at the other end to the cover. The drive straps 42 are leaf springs.

Figure 1:
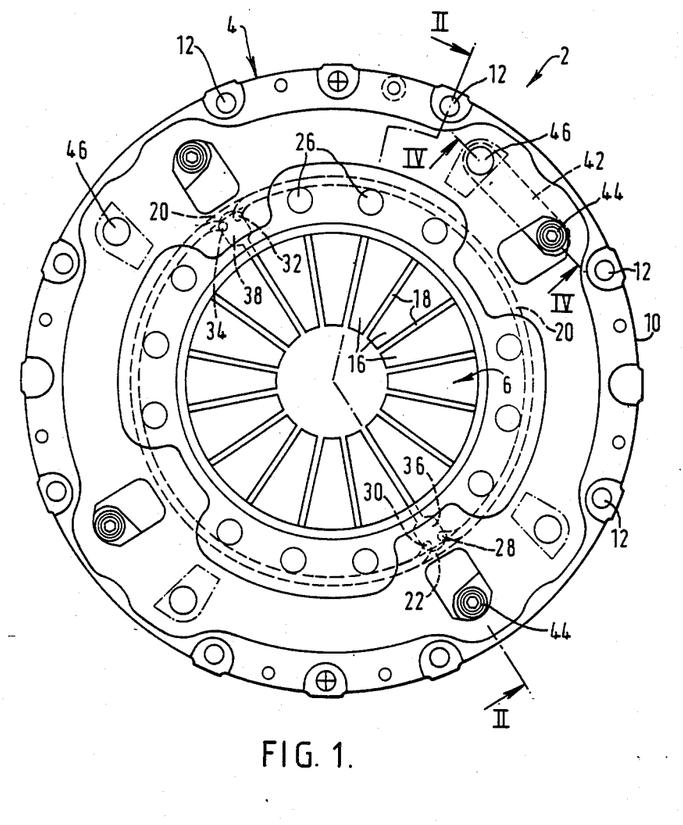
FIG. 1 is a plan view of a clutch cover assembly formed according to the first aspect of the invention.
Figures 2, 3, 4:
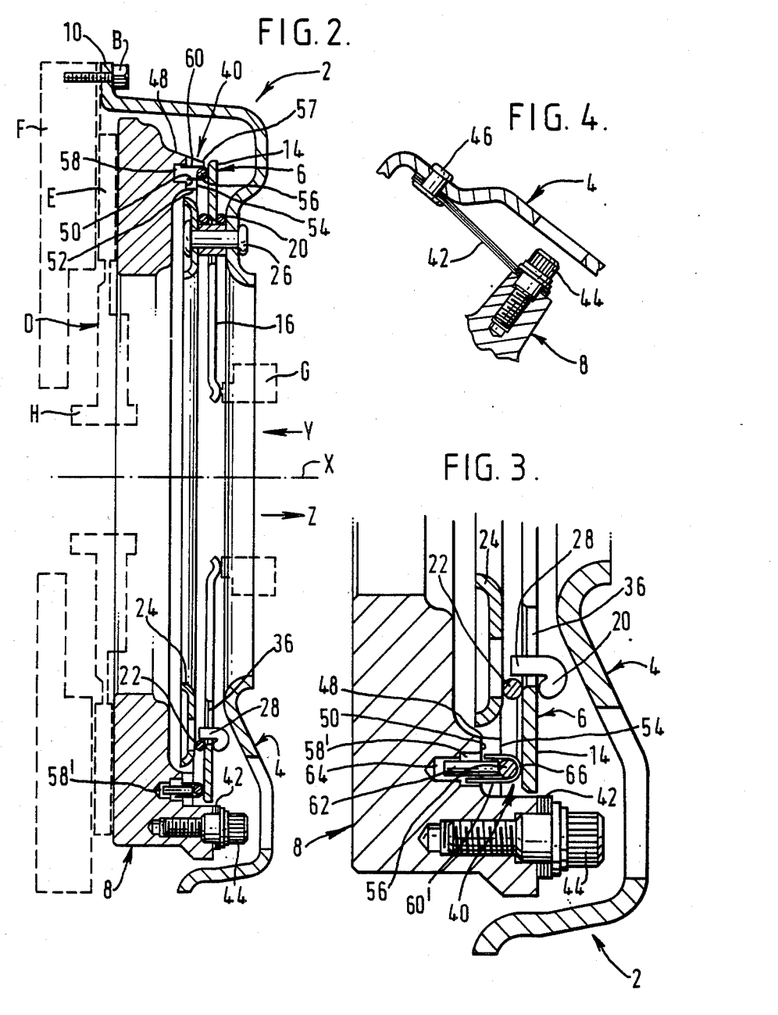
FIG. 2 is a section of the cover assembly on line II—II of FIG. 1 in combination with driven and driving plates (shown in dotted line) to form a clutch.
FIG. 3 is an enlarged fragment of the cover assembly shown in FIG. 2.
FIG. 4 is a fragmentary section on line IV—IV in FIG. 1.
Figure 5:
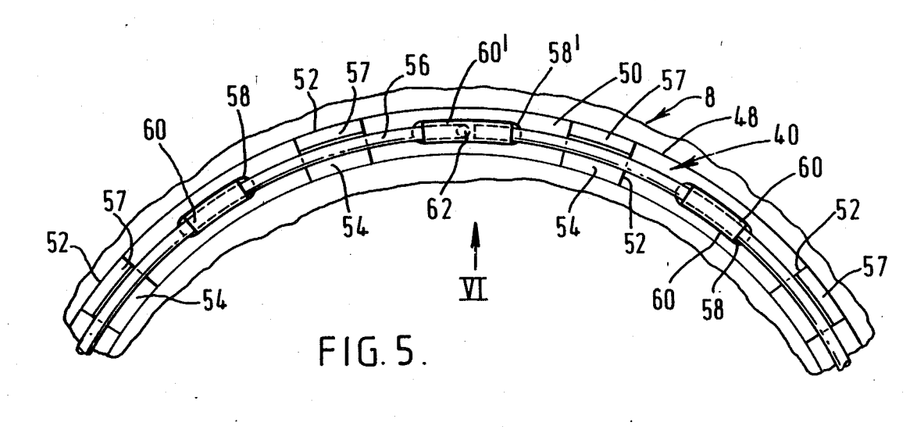
FIG. 5 is a diagrammatic plan view on enlarged scale of a fragment of the pressure plate of the assembly of FIG. 1 showing the fulcrum ring and the elements thereastride.
Figure 6:
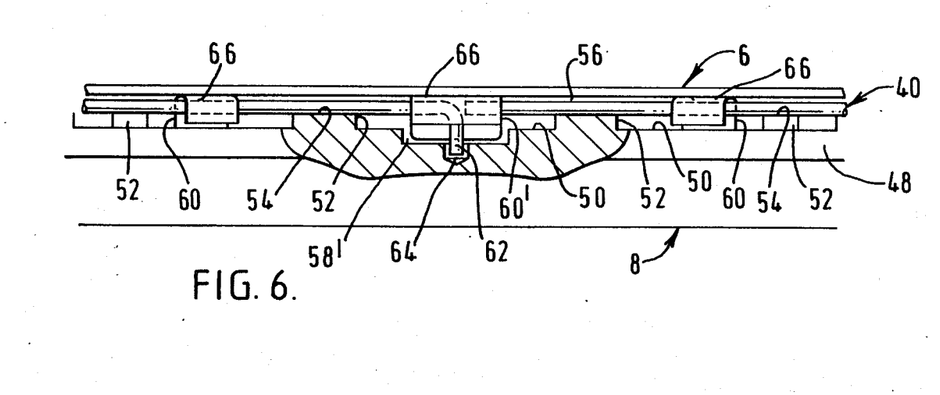
FIG. 6 is a fragmentary and diagrammatic development, partly in section, looking in direction VI in FIG. 5 with the diaphragm spring present.

In FIG. 2 the clutch formed using the cover assembly 2 is shown fully engaged in that the driven plate D is clamped between the driving plate F and the pressure plate 8 under the full load of the diaphragm spring 6. This clutch is of the push-type in that the clamping load of the diaphragm spring 6 is relieved when a release bearing G (known per se) pushes the fingers 16 in direction Y which allows the leaf springs 42 to urge the pressure plate in direction Z relatively to the cover 4. In FIGS. 5 and 6 the cover assembly is shown in the attitude corresponding to the clutch being fully released.

The fulcrum arrangement 40 centred on axis X comprises an annular rib 48 on the pressure plate 8. This rib has a flat plateau 50 from which lands 52 project. The lands have flat co-planar faces 54 supporting a split fulcrum ring 56. The fulcrum ring 56 is of resilient material, for example steel wire, and in unstressed state is substantially flat. The ring 56 may have any desired cross-sectional shape, and is shown in the FIGS. as being circular. The lands 52 are substantially similar and are substantially equally spaced apart, and radially outwardly each has an outstanding lug 57 restraining the fulcrum ring 56 radially. Axially these lugs are of lesser dimension, from the faces 54, than the thickness of the ring 56.

Mid-way between the lands 52 are circumferentially elongate recesses 58 and $58^1$. The recesses 58 are each substantially the same whilst $58^1$ is circumferentially longer.

Saddles, 60 and $60^1$, which may be metal, are of substantially U-shaped cross-section and sit astride the ring. The saddles 60 are all substantially similar and are placed over the recesses 58 so that when the fulcrum ring 56 is substantially unstressed axially at least one limb of each saddle remains in the corresponding recess 58 having circumferentially spaced opposite end walls 59 (FIG. 7) acting as stops to retain the saddle in its given circumferential position relative to the other saddles and the lands 52. As can be seen in FIGS. 2, 3 and 6 each saddle 60 or $60^1$ has one limb longer than the other.

One end of the fulcrum ring 56 at its split has an axially turned peg 62 engaging a bore 64 in the base of recess $58^1$ to inhibit rotation of the ring. The saddle $60^1$ spans the split in ring 56 and circumferentially is longer than the other saddles 60.

The cross-piece 66 of each U-shaped section of the saddles 60 and $60^1$ provides a distance piece proud of the fulcrum ring 56 so that the diaphragm spring 8 abuts the distance pieces 66.

Figure 7:
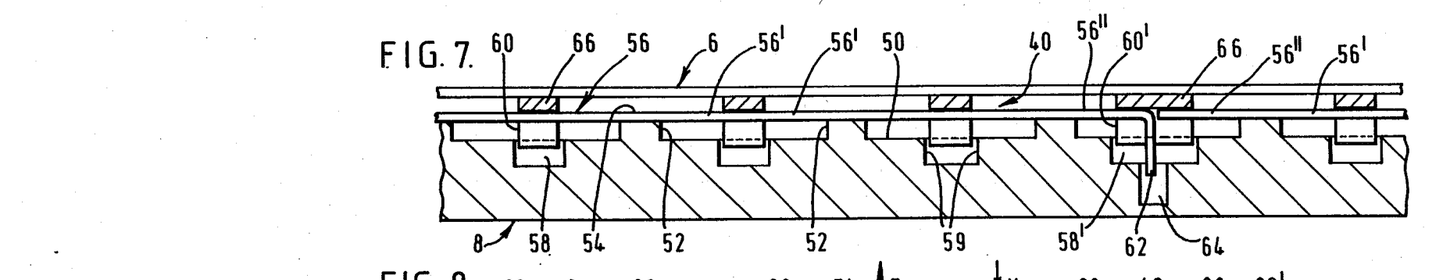
FIG. 7 is a diagrammatic development comparable with FIG. 6 when the diaphragm spring is applying little or no force to the fulcrum ring.
Figure 8:
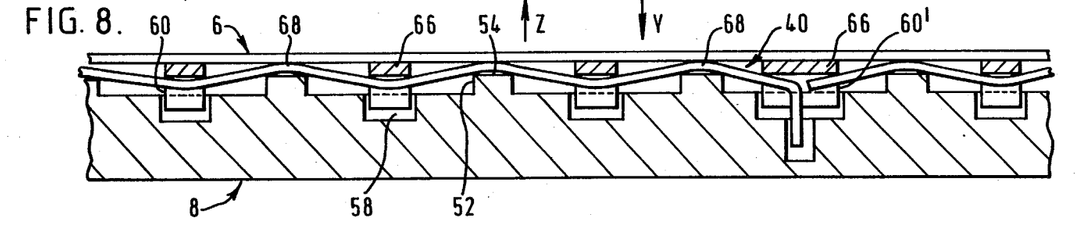
FIG. 8 is a view similar to FIG. 7 showing a stage in axial deformation of the fulcrum ring by pressure of the diaphragm spring.
Figure 9:
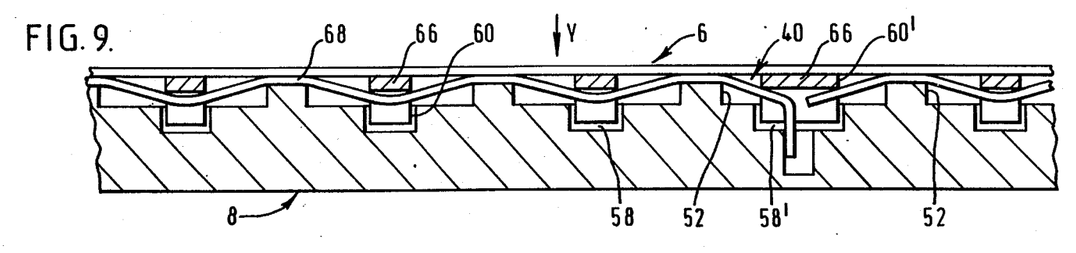
FIG. 9 is a view similar to FIG. 8 showing a further stage in the axial deformation of the fulcrum ring.

Now referring to FIGS. 7 to 9 and initially to FIG. 7, it represents diagrammatically the situation where the clutch is fully released due to the diaphragm spring 6 applying zero or a minimum loading to the distance pieces 66. During clutch re-engagement the release bearing G (FIG. 2) is allowed to move in direction Z as the diaphragm spring 6 moves relatively to the cover 4 to apply clamping load to the driven plate D. This movement of the diaphragm spring is initially cushioned by it first pressing on the saddles 60, $60^1$ to deform portions $56^1$, $56^{11}$ of the fulcrum ring 56 between the lands 52, axially in the direction Y in FIG. 8, in the spaces between the supporting lands 52. That axial deformation stresses the fulcrum ring 56 giving it the tendency to axially bow at 68, in direction Z, over each supporting land 52.

As one progresses to full re-engagement of the clutch from the situation in FIG. 8 to that in FIG. 9 the portions of the fulcrum ring 56 between the lands 52 are further deformed in direction Y, but additionally the cushioning of the diaphragm spring 8 becomes more stiff due to compression of the bows 68 in axial direction Y by contact by the diaphragm spring moving further relatively to the cover 4.

The provision of the aforesaid cushioning which to some extent may be regarded as two stage cushioning can give a smooth engagement characteristic to the clutch so, as indicated above, the clutch cover assembly 2 may be used in conjunction with a driven plate having non-cushioned friction facings and give a subjectively acceptable clutch engagement.

The saddles 60 and $60^1$ may be formed to resiliently clip themselves to the fulcrum ring 56. The limbs of each saddle may be the same length, if desired.

The portions $56^1$ of the fulcrum ring 56 extending over each recess 58 to span the gap between the adjacent lands 52 to either side of each said recess 58 are substantially encastre beams, i.e. each supported at both ends by the adjacent lands. On the other hand the two end parts $56^{11}$ of the fulcrum ring where the split occurs are cantilever beams being each only supported at one end by a respective land 52 adjacent to the recess $58^1$. If saddle $60^1$ were the same circumferential length as the saddles 60 the combined cantilevers $56^{11}$ would be less stiff than each beam $56^1$. By lengthening the saddle $60^1$ the resultant combined stiffness of cantilevers $56^{11}$ can be made substantially equal to each beam $56^1$.

It will be appreciated that the nature and stiffness of the cushioning provided can be varied from one clutch to another, or in the same clutch different rates or stages of cushioning may be attained by:

(i) varying the thickness or stiffness of the fulcrum ring, and/or (ii) varying the distance between any two adjacent lands 52, and/or (iii) varying the circumferential length of any saddle 60 or $60^1$, and/or (iv) varying the circumferential length of any face 54 of any land.

As an alternative or in addition, the fulcrum arrangement 20 (FIG. 2) may be substituted by one comparable to 40 in which the cover 4 is provided with supporting lands and openings to receive limbs of the saddles astride the fulcrum ring on those supporting lands.

Figure 10:
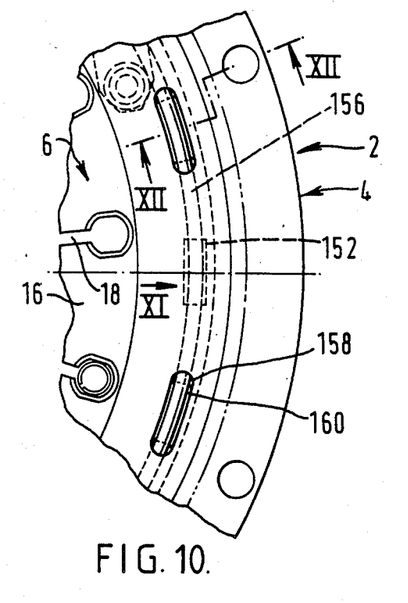
FIG. 10 is a fragment of a plan view of another embodiment of cover assembly formed according to the first aspect of the invention applied to a pull-type
Figure 11:
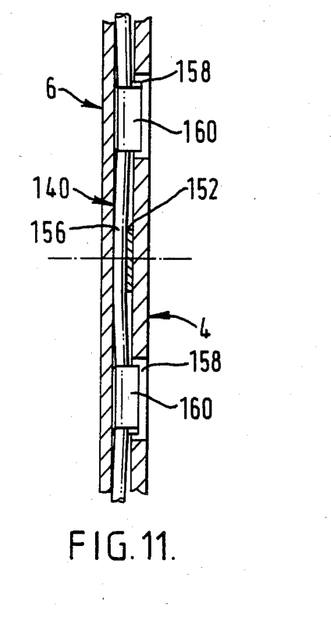
FIG. 11 is a fragment of a diagrammatic development, partly in section, of the cover assembly in FIG. 10 from direction XI, FIG. 12 a diagrammatic section on line XII—XII in FIG. 10.
Figure 12:
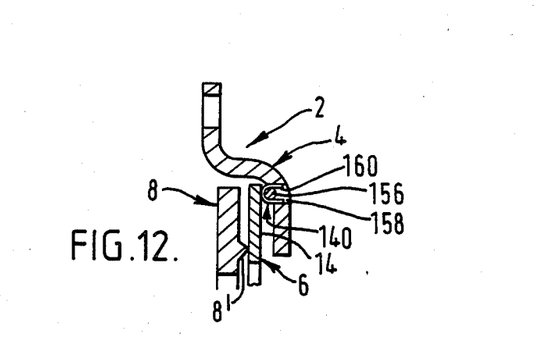

With reference to the cover assembly for a pull-type clutch shown in FIGS. 10 to 12, in which the fingers of the diaphragm spring 6 are pulled by a release bearing to release the clutch, the radially outermost fulcrum arrangement 140 on the cover 4 comprises a split fulcrum ring 156 over supporting lands 152 mounted on the cover. Openings 158 in the cover 4 receive the limbs of the U-shaped saddles 160 whose cross-pieces are abutted by the diaphragm spring 6. The condition of the cover assembly in FIG. 11 corresponds with a clutch fully engaged position. In FIG. 12 the pressure plate 8 has an annular fulcrum arrangement $8^1$. As an alternative or in addition, the fulcrum arrangement $8^1$ may be substituted by one similar to 40 in FIGS. 1 to 9.

Figure 13:
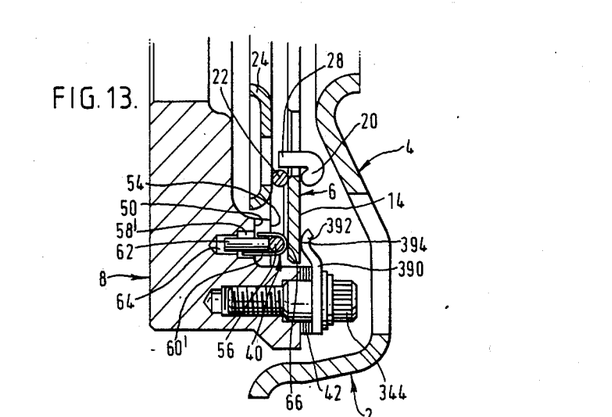
FIG. 13 in view similar to FIG. 3 of a modification of the clutch cover assembly in FIGS. 1 to 9.

There can be some difficulty in forming fulcrum rings which in an initial unstressed state are completely flat. If such a non-flat fulcrum ring is used with saddles thereon, then during clutch re-engagement irregular variations in stressing of the fulcrum ring at different portions therearound can simultaneously occur which can cause an uneven distribution of the cushioning effect around the fulcrum ring. To avoid or at least reduce that possibility the modification shown in FIG. 13 can be used. In FIG. 13 each bolt 344 is longer than the bolts 44 in FIG. 3 and these longer bolts are additionally used to firmly clamp respective clips or braces 390 to the pressure plate 8. Each brace 390 can be a plate or strip which can extend generally radially (shown edge on in FIG. 13), and has a bent end part 392 with a curved surface 394 which is convex to the diaphragm spring 6. In the clutch fully released state the braces 390 can press on the diaphragm spring 6 which presses on the cross-pieces 66 of the saddles $60^1$ (60) to pre-load the fulcrum ring 56. This pre-loading may be only slight. The pre-load may either hold the fulcrum ring 56 flat or may create an initial axial deformation of the fulcrum ring in direction Y at the portions $56^1$ and $56^{11}$ (Y, $56^1$ and $56^{11}$ are shown in FIGS. 7 and 8), which deformations may be only slight and can be of the same axial extent. Thus prior to re-engagement of the clutch from its fully released state the fulcrum ring portions $56^1$ and $56^{11}$ (FIG. 7) spanning the spaces between adjacent lands 54 can be in a substantially identical stress condition to better ensure a more even cushioning effect around the fulcrum ring. The surfaces 394 of the braces 390 make line contacts with the diaphragm spring, these line contacts all lying in a common plane transverse to the axis of the clutch cover assmbly. As indicated earlier, the lands 54 all lie in a common plane transverse to the axis of the clutch cover assembly. The amount of pre-load due to the braces 390 is set by the distance d (not shown), when the clutch is fully released, between the plane of the lands 54 and the plane of the line contacts by the surfaces 394 on the diaphragm spring. Therefore when the braces 390 are formed and mounted so that d is equal to the combined thicknesses of the fulcrum ring 56 and of a said cross-piece 66 of a saddle and of the Belleville portion 14, the fulcrum ring is held flat when the clutch is in fully released state. Whereas if d is chosen to be less than the aforesaid combined thicknesses, ring portions $56^1$ and $56^{11}$ (FIG. 7) will be axially deformed when the clutch is in fully released state.

The braces 390 are preferably stiff so that either none flex or they flex very little so that all apply the same or substantially same amount of pre-load to the diaphragm spring The effect of pre-loading by means of the braces 390 can modify the clutch take-up characteristic and cushioning may only commence during clutch re-engagement, when the force exerted between the pressure plate 8 and diaphragm spring 6 exceeds the pre-load Therefore the clutch take up characteristic can be modified as desired according to the pre-load chosen for the braces to exert.

During clutch disengagement the braces 390 act with the diaphragm spring to pull back the pressure plate 8. So the spring release straps 42 need only create a lesser pull than when braces are not used and the release straps need not flex as much and thus are subject to less stressing.

In a pull-type clutch such as shown in FIG. 12, the fulcrum ring 156 may be pre-loaded by braces secured to the cover 4, and pressing on or making contact with the diaphragm spring 6; such braces avoiding the pressure plate 8.

Figure 14:
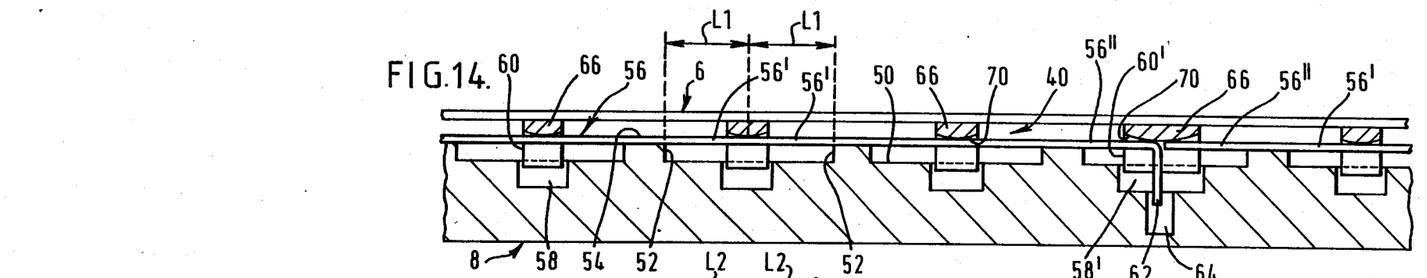
FIGS. 14, 15 and 16 are views simillar to FIGS. 7 to 9 respectively of a modification of the clutch cover assembly in FIGS. 1 to 9, the modification being formed in accordance with the second and third aspects of the invention.
Figure 15:
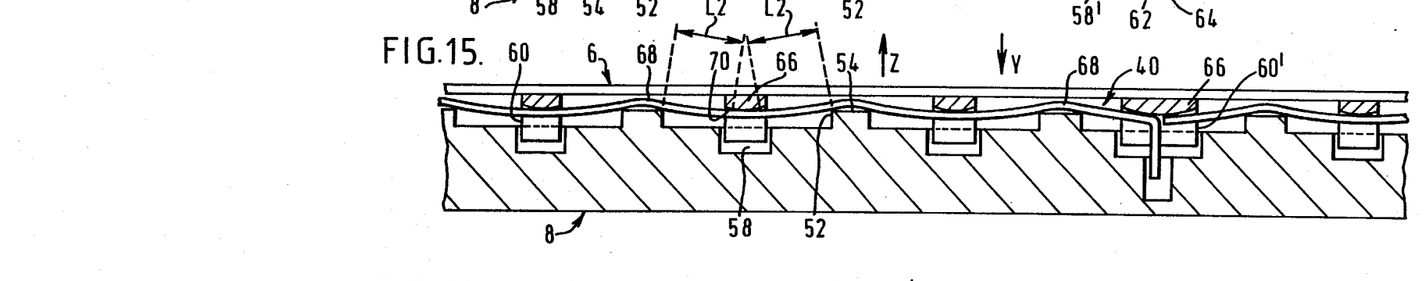
Figure 16:
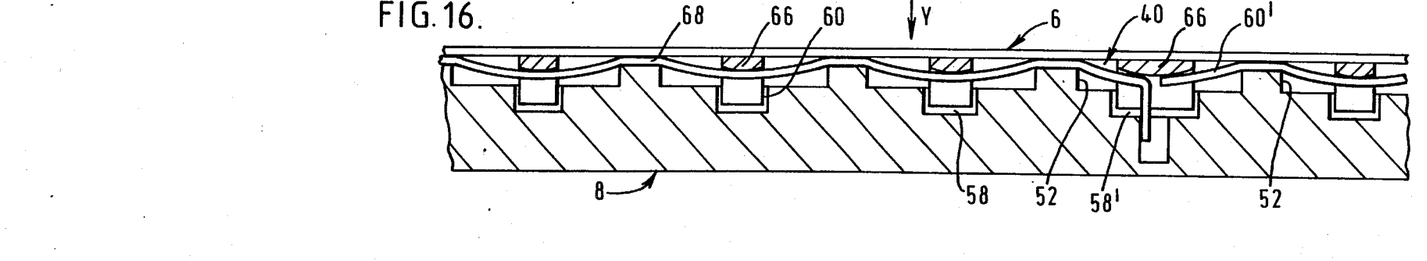

The clutch cover assembly represented in FIGS. 14 to 16 incorporates the modification of a convex surface 70 on the underside of the cross-pieces 66, $66^1$ of the U-shaped saddles 60 and $60^1$.

The convex surface 70 can be substantially part of a cylindrical surface, or can have any other curved or dihedral or polydedral convex shape.

It is believed that the provision of the convex surface 70 gives a better flexing character to the resilient fulcrum ring 56 and a more smooth curve form to the deformation of the ring during clutch re-engagements.

When the fulcrum ring 56 is substantially non-deformed as in FIG. 14 each ring portion 561 comprises two free lengths or beam parts each of a length L1 extending from one of the lands 52 to the point of tangential contact between the fulcrum ring and the convex surface 70 of the element 60 corresponding to the fulcrum ring portion $56^1$. As the fulcrum ring is axially deformed, each fulcrum ring portion $56^1$ adjacent to the respective element 60 conforms more closely with the convex surface 70 as the tangential contact becomes an increasingly longer line contact. In the situation such as shown in FIG. 15 the free lengths of each ring portion $56^1$ have become L2 which is less than L1. This shortening of the free lengths makes them progressively more stiff and thus progressively hardens the cushioning as the fulcrum ring is increasingly deformed axially towards the pressure plate 8. The cushioning is further hardened during axial compression of the bows 68 (FIG. 16).

Figure 17:
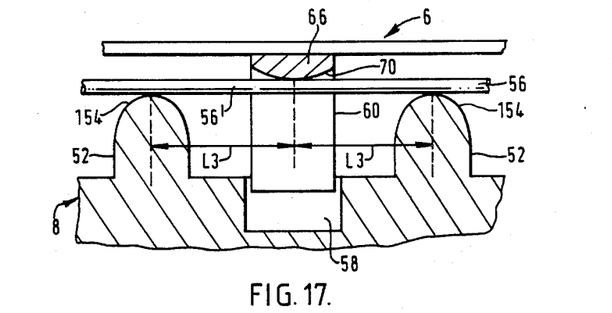
FIG. 17 is a fragmentary and diagrammatic view, cover assembly formed according to the second, third and fourth aspects of the invention and corresponding to a clutch fully disengaged state.
Figure 18:
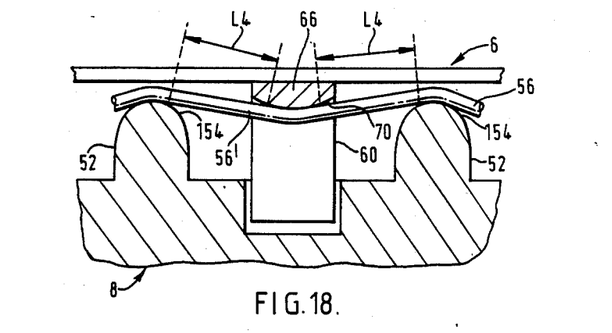
FIG. 18 shows the clutch cover assembly of FIG. 17 in the course of clutch engagement causing axial deformation of the fulcrum ring.

In the further modification in FIGS. 17 and 18 each land 52 has a convex face 154 to which the fulcrum ring 56 is applied. The face 154 can be substantially part of a cylindrical surface or have any other curved, dihedral or polyhedral convex shape.

FIG. 17 corresponds to a clutch fully disengaged state and in that condition each fulcrum ring portion $56^1$ makes substantially tangential point contact with the corresponding surface 70 and with the curved faces 154 to either side. Thus each fulcrum ring portion comprises two free lengths each of length L3. As the fulcrum ring 56 is progressively axially deformed these free lengths become progressively shorter due to the ring conforming more closely to the surfaces 70, 154 with which it makes increasing line contacts as indicated in FIG. 18 where the length of each free length of the portion $56^1$ has decreased to L4. As the free lengths decrease the fulcrum ring becomes increasingly more stiff in deformation.

If desired, in FIGS. 17 and 18 the curved surface 70 may be replaced by a flat surface such as on the elements 60 in FIGS. 1 to 13.

The curvature of the surfaces 70 and/or 154 can be varied and can be varied from one said surface to another in the same clutch cover assembly to attain a desired cushion characteristic.

What is claimed is:

1. A diaphragm spring clutch cover assembly comprising a pressure plate, a cover, a diaphragm spring for loading the pressure plate, a first annular fulcrum arrangement to one side of the diaphragm spring and provided on the pressure plate, a second annular fulcrum arrangement to the opposite side of said diaphragm spring and provided on the cover, and the diaphragm spring acting between the fulcrum arrangements, at least one of the fulcrum arrangements comprising cushioning means comprising a resilient fulcrum ring, an annular array of spaced supporting means supporting the ring about the axis of the diaphragm springs, portions of the ring each spanning a respective space between adjacent said supporting means, elements astride the ring at spaced locations around the ring, each element being at a respective said portion, and each said element providing a distance piece proud of the ring, and the distance pieces being urgeable by the diaphragm spring for the resilient deformation of said respective portions axially of the ring in their respective spaces during movement relative to the cover of the diaphragm spring for the latter to apply increasing loading on the pressure plate.

2. A clutch cover assembly according to claim 1, wherein each said element astride the fulcrum ring has a substantially U-shaped cross-section and the distance piece is the cross-piece of the U.

3. A clutch cover assembly according to claim 2, wherein one limb of at least one said U-shaped elements is longer than the other limb.

4. A clutch cover assembly according to claim 1, wherein a said element is engageable by respective stop means on one of said pressure plate and said cover for maintaining the element at substantially the same position around the fulcrum ring.

5. A clutch cover assembly according to claim 1, wherein at least one of said elements is clipped to the fulcrum ring.

6. A clutch cover assembly according to claim 1, wherein the fulcrum ring has at least one interruption extending therethrough, and said interruption is spanned by a said element.

7. A clutch cover assembly according to claim 1, wherein, in a circumferential direction of the fulcrum ring, a said element is longer than another said element.

8. A clutch cover assembly according to claim 6, wherein said element spanning said interruptions is longer, in a circumferential direction of the fulcrum ring, than another of said elements.

9. A clutch cover assembly according to claim 1, wherein an increase in the diaphragm spring loading on the pressure plate subsequent to a position of minimum loading deforms aforesaid fulcrum ring portions axially of the ring in a first direction and stresses the ring making it bow in an opposite second direction at aforesaid supporting means for the diaphragm spring to press on at least one of the bows for deforming said bow(s) axially of the ring by compression of the bow(s) in said first direction.

10. A clutch cover assembly according to claim 1, wherein the diaphragm spring is pre-loaded towards the fulcrum ring by bracing means in contact with the diaphragm spring.

11. A clutch cover assembly according to claim 2, wherein at least one of said elements has a surface pressed against its respective said portion of the ring by urging by the diaphragm spring, said surface is convex with respect to the ring, said convex surface is on said cross-piece of a said U-shaped element, and, with respect to the ring, said convex surface extends substantially circumferentially along the ring and at least a portion of said convex surface diverges progressively away from the pressure plate.

12. A clutch cover assembly according to claim 11, wherein during axial deformation of said portion of the fulcrum ring a part of said portion in contact with the convex surface conforms more closely to that convex surface whereby a free length of said portion extending between an adjacent said supporting means and the element having the convex surface progressively decreases.

13. A clutch cover assembly according to claim 12, wherein a said supporting means adjacent to a said element has a surface which is convex to the fulcrum ring applied against the surface, and as axial deformation of the portions of the fulcrum ring increase a part of the fulcrum ring over the convex surface of that supporting means conforms more closely to the convex surface of that supporting means further decreasing the length of said free length.

14. A clutch cover assembly according to claim 1, wherein a said supporting means adjacent to a said element has a surface which is convex to the fulcrum ring applied against that surface, and wherein during axial deformation of a said portion of the fulcrum ring a part of said portion in contact with the convex surface conforms more closely to that convex surface whereby a free length of said portion extending between the element on said portion and the convex surface progressively decreases.

15. A clutch cover assembly according to claim 11, wherein an aforesaid convex surface is a curved convex surface.

16. A clutch cover assembly according to claim 14, wherein an aforesaid convex surface is a curved convex surface.

17. A clutch cover assembly according to claim 12, wherein the progressive decrease in an aforesaid free length makes said free length progressively more stiff to deformation.

18. A clutch cover assembly according to claim 14, wherein the progressive decrease in an aforesaid free length makes said free length more stiff to deformation.

19. A diaphragm spring clutch having a clutch cover assembly formed according to claim 1.

* * * * *